United States Patent

Baumgartl et al.

[11] Patent Number: 5,476,628
[45] Date of Patent: Dec. 19, 1995

[54] GMT SHEET MATERIAL PRODUCED FROM GMT RECYCLATE

[75] Inventors: Horst Baumgartl, Mainz; Karl-Ludwig Brentrup, Lotte; Jürgen Hofmann, Ludwigshafen; Peter Ittemann, Lampertheim; Rainer Nachtrab, Ludwigshafen; Hilmar Ohlig, Kaiserslautern; Alois Schlarb, Frankenthal, all of Germany

[73] Assignee: BASF Aktiengesellschaft, Ludwigshafen, Germany

[21] Appl. No.: 303,465

[22] Filed: Sep. 9, 1994

[30] Foreign Application Priority Data

Sep. 11, 1993 [DE] Germany .......................... 43 30 861.9

[51] Int. Cl.⁶ .................................................. B29C 47/04
[52] U.S. Cl. .......... 264/210.2; 264/37; 264/141; 264/210.6; 264/211.23; 264/257; 264/320; 264/DIG. 69; 428/283; 428/285
[58] Field of Search ............... 264/211.23, 349, 264/174, 257, 210.6, 37, 141, DIG. 69, 320, 210.2; 425/114, 371; 428/284–285, 288, 283

[56] References Cited

U.S. PATENT DOCUMENTS

| | | | |
|---|---|---|---|
| 4,692,373 | 9/1987 | Welz et al. | 428/285 |
| 4,885,205 | 12/1989 | Wahl et al. | 156/148 |
| 4,897,233 | 1/1990 | Bier et al. | 264/349 |
| 5,106,564 | 4/1992 | Iwanami et al. | 425/204 |
| 5,122,398 | 6/1992 | Seiler et al. | 428/188 |
| 5,145,617 | 9/1992 | Hermanson et al. | 264/37 |
| 5,155,147 | 10/1992 | Dietz et al. | 524/9 |
| 5,212,223 | 5/1993 | Mack et al. | 524/318 |
| 5,340,642 | 8/1994 | Baumgartl et al. | 428/288 |
| 5,358,680 | 10/1994 | Boissonnat et al. | 264/211.23 |
| 5,395,576 | 3/1995 | Blauhut et al. | 264/174 |

FOREIGN PATENT DOCUMENTS

| | | | |
|---|---|---|---|
| 148762 | 7/1985 | European Pat. Off. | |
| 62-28214 | 2/1987 | Japan | 264/257 |

OTHER PUBLICATIONS

Kunststoffe 83 1–(1993), 377–382.

*Primary Examiner*—Jeffery R. Thurlow
*Attorney, Agent, or Firm*—Keil & Weinkauf

[57] ABSTRACT

Semi-finished GMT sheet material of GMT recyclate in which more than 50% by weight of the glass fibers are more than 2 mm in length and which is produced by extruding GMT recyclate particles without significant comminution of the glass fibers.

6 Claims, No Drawings

5,476,628

GMT SHEET MATERIAL PRODUCED FROM GMT RECYCLATE

The present invention relates to a process for producing a semi-finished glass mat reinforced thermoplastic (GMT) sheet material using GMT recyclate.

Glass mat reinforced polypropylene is finding increasing use, especially in automotive construction. This makes it necessary to develop methods for re-using reject components, retained samples, stamping waste and also—as far as possible—used components. A practicable method involves adding recyclate particles directly at the stage of producing the semi-finished material, see A. K. Schlarb et al., Glass mat reinforced polypropylene—a recyclable material, in KUNSTSTOFFE 83 (1993), 377–382. Subsequently the used components are intially broken into coarse pieces, and metallic impurities are removed. Then the fragments are reduced to extruder size in a cutting mill, and fines are removed. The mill base is then fed, together with additives and matrix granules, into an extruder, where it is melted, and the melt is combined in a double belt press with glass mats to form a semi-finished GMT material which may have a recyclate content of up to 70% by weight.

An unsatisfactory aspect of this process is that the stage of producing the semi-finished material requires a fresh supply of expensive glass mats. It is true that the recyclate particles contain a sufficient amount of glass fibers, but these are comminuted in the course of the processing on conventional extruders down to a length below 1 mm, so that they are incapable of ensuring that the extruded semi-finished material will hold together during its further processing into a finished component.

It is an object of the present invention to devise a process for using GMT recyclate whereby a semi-finished fiber-reinforced sheet material can be produced without glass mats.

We have found that this object is achieved when the extrusion of the GMT recyclate particles is carried out in such a way that the glass fibers are not significantly comminuted. "Not significantly" means in this context that they are at most comminuted to about a quarter of their original weight-average length. This is possible with special extruders having minimal peak shearing fields. It is true that the principle of fiber length control in single-screw extruders via the shearing action is known. Surprisingly, however, even customary twin-screw extruders were found to be capable of extruding sheets reinforced with long fibers. A semi-finished material produced in this way was found to have a better compression molding flowability than conventional semi-finished GMT material—surprisingly without deterioration in the other processing properties of the semi-finished material or especially in the stiffness level of the finished components produced therefrom.

The present invention accordingly provides a process for producing a semi-finished glass mat reinforced thermoplastic (GMT) sheet material by plasticating comminuted GMT recyclate particles with or without up to 50% by weight of fresh thermoplastic and/or fresh glass fibers in an extruder, extruding the plasticated material through a die, and molding the extrudate into a sheet material with or without lamination on both sides with a fiber web having a basis weight from 20 to 50 g.m$^{-2}$, which comprises extruding the GMT recyclate particles without significant comminution of the glass fibers and molding the sheet material without glass mats being supplied.

The present invention further provides a semi-finished glass mat reinforced thermoplastic (GMT) sheet material containing from 40 to 80% by weight of a thermoplastic and from 60 to 20% by weight of glass fibers and comprising more than 50% by weight of GMT recyclate, wherein more than 50% by weight of the glass fibers are more than 2 mm in length and more than 5% by weight are less than 2 mm in length.

EP-A-148 762 concerns porous shaped articles composed of fiber-reinforced thermoplastic material, which are produced from a semi-finished glass mat reinforced polypropylene sheet material. The referenced document contains a statement to the effect that returned material can be added in the course of production of the semi-finished material. The length of the glass fibers can be between 7 and 50 mm; fibers having a uniform length of 13 mm are used in the examples. A broad fiber length distribution with more than 5% by weight of fibers shorter than 2 mm is not described, nor is it customary in the "paper process" to which EP-A-148 762 relates.

The semi-finished sheet material of the invention contains from 40 to 80% by weight of a thermoplastic and from 60 to 20% by weight of glass fibers. Suitable thermoplastics are polyolefins, polyamides, saturated polyesters, polycarbonates, polyether ketones, polyether imides and polyether sulfones. Preference is given to a propylene homopolymer having a melt flow index MFI from 5 to 500, in particular from 50 to 400 [g/10 min], and also to polypropylene graft polymers, for example with acrylic acid.

The semi-finished material may in addition contain customary additives, such-as stabilizers, fillers, dyes, flame retardants and adhesion promoters.

The semi-finished material of the invention is produced starting from GMT recyclate with or without the addition of up to 100% of its weight of fresh thermoplastic and/or glass fibers. The semi-finished material consequently contains at least 50% by weight, preferably more than 70% by weight, of GMT recyclate.

The starting material for the production of the semi-finished material comprises GMT recyclate particles which—as described in the referenced paper in KUNSTSTOFFE—are obtained from GMT waste by grinding and preferably have a number-average particle size from 3 to 40 mm, preferably from 5 to 25 mm, especially from 10 to 15 mm. The particle size is for the purposes of the present invention the longest diameter of the particles, which generally have the shape of flat, irregularly shaped platelets with a thickness from about 1 to 5 mm, preferably from 2 to 4 mm.

The recyclate particles are fed into an extruder with or without the addition of up to 50% by weight of fresh thermoplastic and/or glass fibers. Preference is given to feeding up to 30% by weight of polypropylene granules and glass fiber rovings in a weight ratio of about 65:35. Variation of this ratio permits specific control of the glass fiber content of the semi-finished material; in the extreme case, the feed comprises only thermoplastic or only glass fibers. This is also the point where further additives, for example stabilizers, nucleating agents and fillers, can be added. The extruder plastificates the thermoplastic and blends it intimately with the other components. The extrusion step is carried out in such a way that the glass fibers introduced with the recyclate particles are at most not significantly comminuted. This is achieved by using weakly shearing single- or multi-screw extruders, preferably corotating twin-screw extruders in which the screws, in contradistinction to the usual construction (eg. for compounding duty), have essentially only weakly shearing elements.

After extrusion, more than 50% by weight of the glass fibers are more than 2 mm in length. A preferred fiber length distribution is:

more than 50% by weight from 2 to 10 mm more than 5% by weight longer than 10 mm more than 5% by weight shorter than 2 mm.

The extrusion will break any added glass fiber rovings in such a way that they will likewise have the fiber length distribution mentioned.

Following plastification and comminution in the extruder, the mixture is extruded through a die, specifically either through a sheet die to form a sheet material directly or through a round die to form a strand which is then molded or shaped into a sheet material. Within this sheet material the relatively long glass fibers touch and cross, so that the sheet material can also be considered a glass mat. The final molding or shaping is effected by means of a calender or a polishing stack, by rolling or preferably on a double belt press. In the course of this step, the sheet material may have laminated to it on both sides a fiber web, preferably comprising glass fibers or paper, having a basis weight from 20 to 50 $g.m^{-2}$, causing the sheet material to gain stability and improving its surface visually and also for further finishing. Unlike customary glass fiber mats (basis weight from 300 to 1200 $g.m_{-2}$), glass fiber webs are comparatively inexpensive in terms of area. The semi-finished product of the invention is preferably from 60 to 500 cm, in particular from 80 to 150 cm, wide, from 1.8 to 6 mm, in particular from 2 to 4 mm, thick and from 1800 to 10,250 $g.m^{-2}$, in particular from 2000 to 6850 $g.m^{-2}$, in basis weight.

The semi-finished material of the invention can be processed into finished components by the customary press molding techniques. For this, it has a better flowability than customary commercial GMT product, reducing the energy requirements of the press molding step. The finished components have satisfactory mechanical properties, in particular a high level of stiffness.

EXAMPLE

GMT stamping waste was ground on a cutting mill into a mill base having an average thickness of 2 mm and an average particle size of 15 mm. The particles were fed gravimetrically at 10 kg/h into a corotating twin-screw extruder (BERSTORFF ZE 40), plastificated at 240° C. for an average residence time of 2 min, and extruded through a sheet die. The extrudate was hauled off via rolls and polished. The semi-finished sheet material obtained is 4 mm thick, its basis weight is 4700 $g.m^{-2}$, and the fiber content is 35% by weight. The glass fibers have the following length distribution:

up to 2 mm: 18% by weight

2–10 mm: 70% by weight more than 10 mm: 12% by weight.

We claim:

1. A process for producing a glass mat reinforced thermoplastic (GMT) sheet material by plastificating comminuted GMT recyclate particles with or without up to 50% by weight of fresh thermoplastic and/or fresh glass fibers in an extruder, extruding the plastificated material through a die, and molding the extrudate into a sheet material with or without lamination on both sides with a fiber web having a basis weight from 20 to 50 $g..m^{-2}$, wherein the GMT recyclate particles are extruded without significant comminution of the glass fibers and wherein the sheet material is molded without glass mats being supplied.

2. The process as defined in claim 1 wherein the GMT recyclate particles have an average particle size (longest diameter) within the range from 3 to 40 mm.

3. The process as defined in claim 1 wherein more than 50% by weight of the glass fibers are more than 2 mm in length after the GMT recyclate particles have been extruded.

4. The process as defined in claim 1 wherein the thermoplastic is polypropylene.

5. A glass mat reinforced thermoplastic (GMT) sheet material containing from 40 to 80% by weight of a thermoplastic and from 60 to 20% by weight of glass fibers and comprising more than 50% by weight of GMT recyclate, wherein more than 50% by weight of the glass fibers are more than 2 mm in length and more than 5% by weight are less than 2 mm in length.

6. The sheet material of claim 5 wherein more than 50% by weight of the glass fibers are from 2 to 10 mm in length, more than 5% by weight are less than 2 mm in length, and more than 5% by weight are more than 10 mm in length.

\* \* \* \* \*